United States Patent [19]

Raidel

[11] Patent Number: 5,033,769
[45] Date of Patent: Jul. 23, 1991

[54] ASYMMETRIC TANDEM AXLE SUSPENSION SYSTEM FOR VEHICLES

[76] Inventor: John E. Raidel, P.O. Box 4586 G.S., Springfield, Mo. 65808

[21] Appl. No.: 564,120

[22] Filed: Aug. 8, 1990

[51] Int. Cl.$^5$ .............................................. B60G 5/00
[52] U.S. Cl. ................................. 280/676; 280/681; 280/687
[58] Field of Search ............... 280/676, 677, 678, 679, 280/680, 681, 682, 683, 684, 685, 686, 687

[56] References Cited

U.S. PATENT DOCUMENTS

| | | | |
|---|---|---|---|
| 2,798,735 | 7/1957 | Compton | 280/681 |
| 3,340,946 | 9/1967 | Whitehead | 280/683 |
| 4,061,361 | 12/1977 | Felburn | 280/687 |
| 4,324,417 | 4/1982 | Johansson | 280/678 |

Primary Examiner—Kenneth R. Rice
Attorney, Agent, or Firm—Rogers, Howell & Haferkamp

[57] ABSTRACT

A tandem axle suspension system distributes a vehicle load asymmetrically to a drive and drag axle of a vehicle, the system comprises a compensator member that is pivotally connected between a front axle seat supporting the vehicle drive axle and a hanger member suspended beneath the vehicle chassis, and a torque beam member that is pivotally connected between the compensator member and a rear axle seat supporting the vehicle drag axle.

16 Claims, 2 Drawing Sheets

ASYMMETRIC TANDEM AXLE SUSPENSION SYSTEM FOR VEHICLES

BACKGROUND OF THE INVENTION (1) Field of the Invention.

The present invention relates to tandem axle suspension systems for vehicles, in particular an asymmetric tandem axle suspension system for vehicles having single axle drive, where the suspension system distributes a majority of the tandem axle vehicle load to the drive axle.

(2) Description of the Related Art.

Tandem axle suspension systems of the type provided by the present invention commonly comprise a hanger member, a compensator assembled to the hanger member, and front and rear torque beams assembled to the compensator. These complete assembles are provided on opposite sides of the vehicle. Each hanger member is connected to and depends from a chassis member on opposite sides of the vehicle. A trunnion shaft extends laterally beneath the chassis of the vehicle and is supported by both hanger members on the opposite sides of the vehicle chassis.

A compensator member is pivotally mounted on the ends of the trunnion shaft, outboard from the hanger members. Each compensator member generally extends parallel to the longitudinal axis of the vehicle chassis, and only a short distance forward of and rearward of the adjacent hanger member. The compensator is also generally symmetric, having similar halves on opposite sides of a vertical plane extending through the pivot connection of the compensator to the trunnion shaft.

The front and rear torque beams are supported by the compensator member. One end of the front torque beam is pivotally connected to the compensator member, just forward of and below the pivot connection of the compensator member to the trunnion shaft. The front torque beam extends forward from its pivot connection to the compensator member and is pivotally connected to a front axle seat member at its forward second end. The front axle seat member generally supports a first drive axle of the vehicle. A torque rod is pivotally connected between the drive axle and the vehicle chassis to control the orientation of the drive axle relative to the vehicle chassis as the axle moves vertically when the vehicle is driven over a road. One end of the rear torque beam is also pivotally connected to the compensator member just rearward of and below the pivot connection of the compensator member to the trunnion shaft. The rear torque beam extends rearward from its pivot connection to the compensator member and is pivotally connected to a rear axle seat member at its rearward second end. The rear axle seat member also generally supports a second drive axle of the vehicle. A second torque rod is pivotally connected between the second drive axle and the vehicle chassis to control the orientation of the second drive axle relative to the vehicle chassis as the axle moves vertically when the vehicle is driven over a road.

Springs are positioned between both the front and rear torque beams and the compensator member to prevent the vertical movements of the first and second axles produced when the vehicle is driven over a road from being transmitted to the vehicle chassis.

In operation, as the tandem axle vehicle is driven over an uneven road surface, the torque beams supporting the axle seats oscillate vertically about their pivot connections to the compensator member. The oscillations of the torque beam exerts a compressive force on the springs positioned between the torque beams and the opposite ends of the compensator member. A fraction of this force is transmitted to the opposite ends of the compensator member, and causes the compensator member to pivot about its trunnion shaft connection and equalize the load distribution between the first and second axles of the tandem axle vehicle. This type of suspension system distributes the vehicle load substantially equally over the first and second drive axles of the vehicle, and the even distribution of the load equally enhances the traction of the vehicle wheels driven by the first and second drive axles.

This type of suspension system can also be used with tandem axle vehicles where only one of the two axles is a drive axle. However, because the compensator evenly distributes the vehicle load over both the drive axle and the drag axle, only about half of the vehicle load is transmitted to the vehicle wheels driven by the drive axle to enhance the traction of those wheels. The other half of the vehicle load is transmitted to the drag axle, but because this is not a drive axle it has no effect on increasing the traction of the vehicle.

The present invention solves this problem by providing an asymmetric tandem axle vehicle suspension system that distributes the vehicle load unevenly to the front and rear axles of a tandem axle vehicle. The asymmetric tandem axle suspension system of the invention can be used with vehicles having dual drive axles, but when used with tandem axle vehicles with only a single drive axle, it distributes a majority of the vehicle load to the drive axle, thereby enhancing the traction of the wheels driven by the drive axle over that which was obtainable by tandem axle suspension systems of the prior art.

It is therefore an object of the present invention to provide an asymmetric tandem axle vehicle suspension system that, when used with a tandem axle vehicle having only one drive axle, distributes a majority of the vehicle load to the drive axle, thereby increasing the tractive force of the vehicle wheels driven by the drive axle over that produced by single axle drive, tandem axle suspension systems of the prior art.

SUMMARY OF THE INVENTION

The suspension system of the present invention includes identical assemblies on opposite sides of a vehicle chassis. On each side of the vehicle, a hanger is suspended downward from the vehicle chassis. A support bracket supporting a trunnion shaft is attached to the underside of each hanger. The trunnion shaft extends laterally beneath the vehicle chassis, and is supported by a pair of support brackets, with each bracket being attached to the underside of a hanger suspended from the opposite sides of the vehicle chassis. The opposite ends of the trunnion shaft extend outboard a short distance from the support brackets and hangers.

Compensator members are pivotally mounted on the projecting ends of the trunnion shaft. Each compensator member has a rectangular cross section, with top and bottom surfaces connected by a pair of sidewalls. The compensator member extends forward and rearward of the hanger, parallel to the longitudinal axis of the vehicle. A center bushing assembly is secured between the sidewalls of the compensator member. The bushing assembly pivotally mounts the compensator member to the end of the trunnion shaft projecting from the hanger and support bracket.

A forward pivot bushing assembly is secured to the forward end of the compensator member. The forward pivot bushing pivotally supports a forward axle seat that, in turn, supports the drive axle of the tandem axle vehicle. The drive axle has a differential assembly at its midpoint, and a torque rod is pivotally connected between the top of the differential housing and the vehicle chassis. The torque road maintains the relative orientation between the driven axle and the vehicle chassis as the drive axle moves vertically relative to the vehicle chassis when the vehicle is driven over an uneven road surface.

A torque beam having forward and rearward ends is pivotally connected to the compensator member. A second pivot bushing assembly is secured to the forward end of the torque beam, and the forward end of the torque beam is inserted into an opening at the rear of the compensator member. The second bushing assembly is connected between the sidewalls of the compensator member just rearward of and below the pivoting connection of the compensator member to the trunnion shaft. The connection between the second bushing assembly and the compensator member enables the rearwardly extending torque beam to pivot relative to the compensator member.

A rear axle seat supporting the vehicle drag axle is pivotally connected to the rear end of the torque beam by a pair of transverse nut and bolt connectors. The rear axle seat comprises a pair of depending sidewalls that are positioned on opposite sides of the torque beam. A hole extending transverse to the longitudinal axis of the vehicle is provided through each of the axle seat sidewalls. The holes are aligned with each other, and coincide with a tubular channel extending through the torque beam. The channel is dimensioned to receive a first horizontal nut and bolt connector of the pair. By inserting the first nut and bolt connector through the pair of holes and the channel, the rear axle seat can be pivoted about the first connector up and down relative to the torque beam. Pairs of coaxial holes are also provided in the top and bottom walls of both the rear axle seat and the rearward end of the torque beam. These holes also line up with each other, and are dimensioned to receive the second nut and bolt connector of the pair. A rubber grommet is positioned between both the top walls of the axle seat and the torque beam, and between the bottom walls of the axle seat and torque beam, and the bolt of the second connector is inserted vertically through the grommets and the aligned holes at the back of the rear axle seat and the torque beam. The grommets permit limited pivoting movement of the axle seat about the horizontal first connector connecting the axle seat to the torque beam, and enable the rear axle seat to automatically stabilize the drag axle and substantially maintain its orientation relative to the vehicle chassis when the vehicle brakes are applied.

Primary and secondary elastomeric springs are provided between the torque beam and the compensator member. The primary spring comprises a plurality of metal plates separated by rubber blocks. The spring is attached at end of to the top surface of the torque beam, and extends upward inside the compensator member between its depending sidewalls. The spring is attached at its opposite end to the underside of the top surface of the compensator. An inclined reaction surface is secured to the top surface of the torque beam just forward of the primary spring. The secondary spring, also comprised of a plurality of metal plates separated by rubber blocks, is attached to the inclined reaction surface at one end. The opposite end of the secondary spring is attached to a plate secured between the depending sidewalls of the compensator. The secondary spring may be constructed of a much harder or less readily compressed material than the material of the primary spring to come into compression when heavy vehicle loads are supported by the suspension system and limit the amount of compression of the primary spring.

The resilient bushing connections between the torque beam and the compensator, and between the compensator and the trunnion shaft, permit limited lateral movement of the forward and rear axle seats when the vehicle goes through a turn. This permits the wheels supported b the axle seats to automatically track the forward wheels of the vehicle, thereby reducing slipping of the wheels over the road surface. Positioning the center bushing assembly, connecting the compensator to the trunnion shaft, forward and above the bushing assembly connecting the torque beam to the compensator, directs the moments and forces exerted against the compensator in a downward direction when the vehicles brakes are applied. This downward directed force on the compensator substantially reduces the tendency of the vehicle wheels to bounce over the road surface.

The unique structure of the compensator, with the drive axle being supported by a forward axle seat pivotally connected directly to the front end of the compensator, and the drag axle being pivotally supported on a torque beam that is pivotally connected to the rear end of the compensator, distributes the vehicle load transmitted through the hanger and trunnion shaft asymmetrically through the compensator so that a majority of the vehicle load is carried by the front drive axle of the tandem axle vehicle, and the remaining vehicle load is carried by the rear drag axle of the vehicle.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

Figure 1:
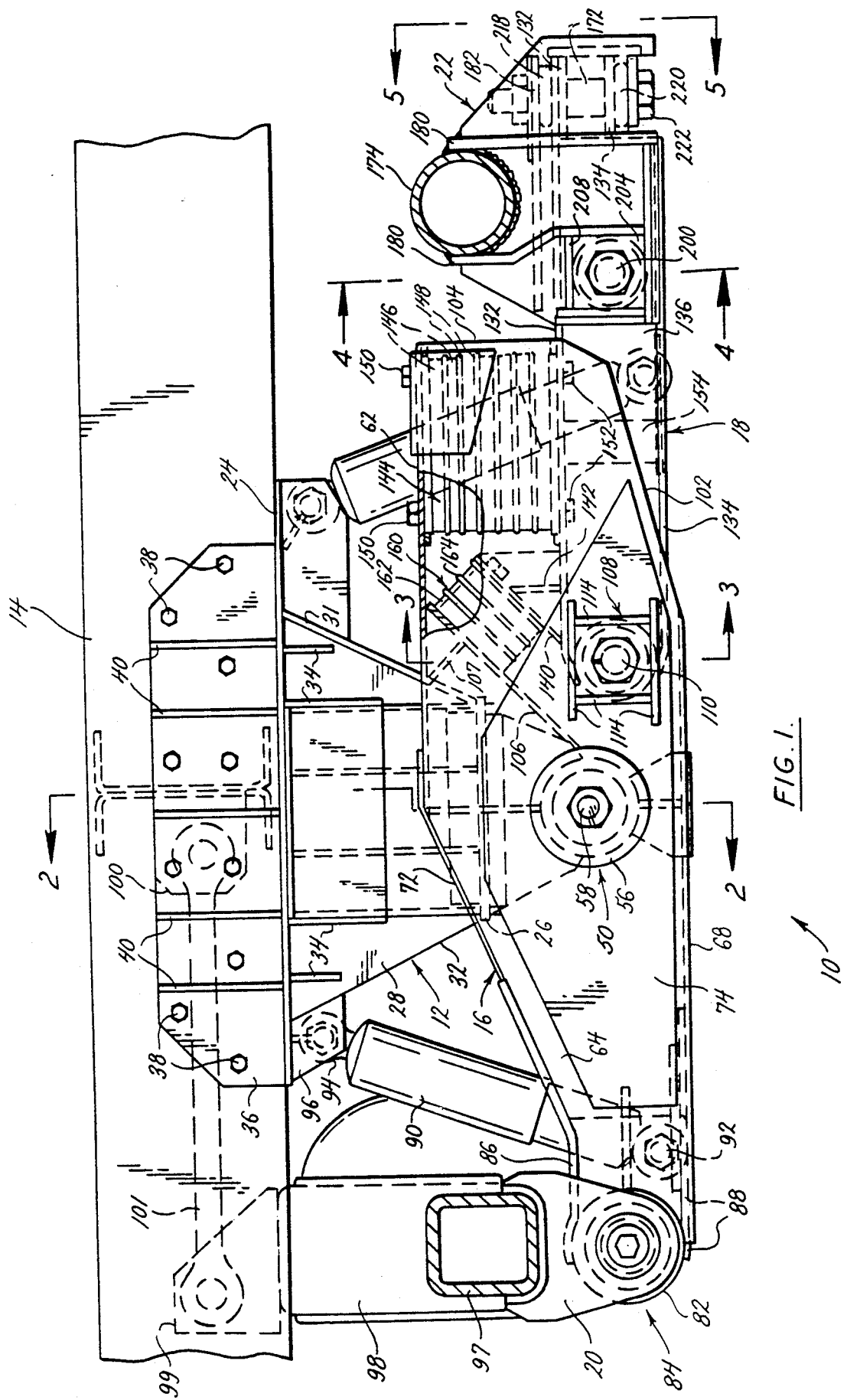
FIG. 1 is a side elevation view of the asymmetric tandem axle vehicle suspension system of the present invention.
Figure 2:
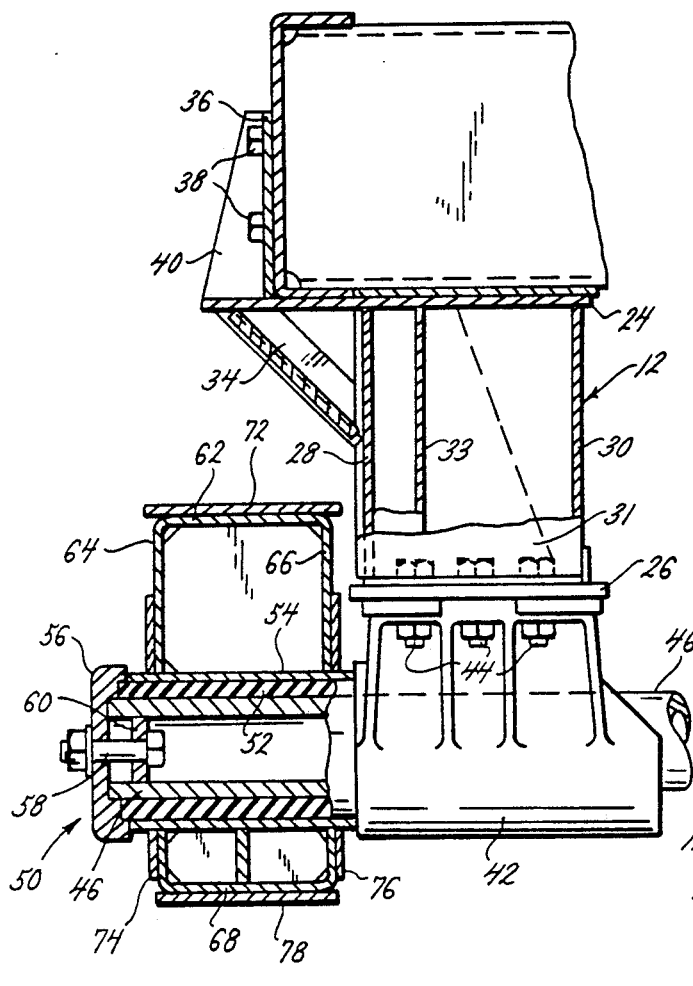
FIG. 2 is an elevation view in section of the suspension system of the present invention taken along the line 2—2 of FIG. 1.
Figure 3:
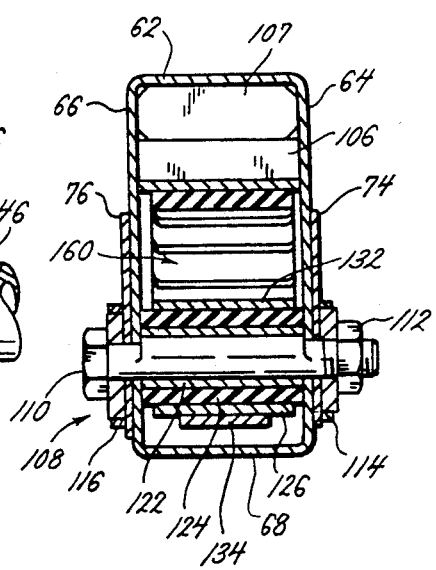
FIG. 3 is an elevation view in section of the suspension system of the present invention taken along the line 3—3 of FIG. 1.
Figure 4:
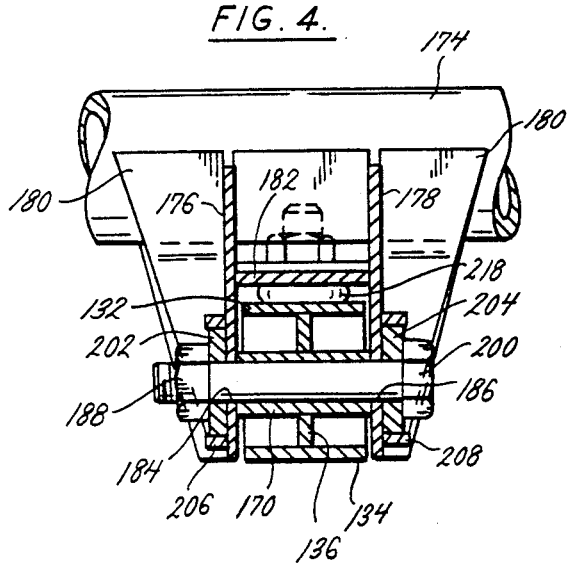
FIG. 4 is an elevation view in section of the suspension system of the present invention taken along the line 4—4 of FIG. 1.
Figure 5:
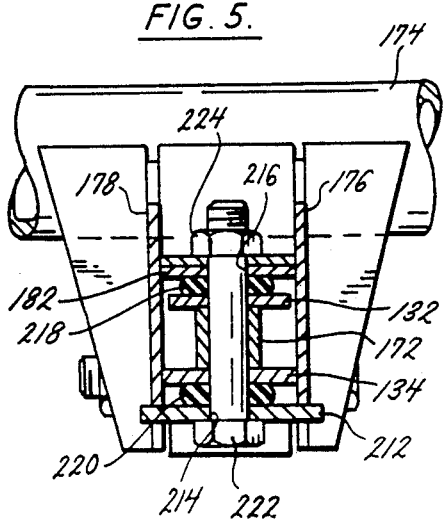
FIG. 5 is an elevation view in section of the suspension system of the present invention taken along the line 5—5 of FIG. 1.

FIG. 1 shows the asymmetric tandem axle vehicle suspension system 10 of the present invention. The suspension system is comprised of a hanger assembly 12 secured to the underside of a vehicle chassis member 14, a compensator member 16, secured to a lower end of the hanger assembly, a torque beam 18 pivotally mounted to the compensator member, a forward axle seat 20 pivotally mounted to the compensator member, and a rearward axle seat 22 pivotally mounted to the torque beam.

It should be understood by those skilled in the art that the suspension system described with reference to FIG. 1 is only one half of a complete suspension system, and that a suspension system like that shown in FIG. 1 is mounted to the vehicle chassis on the opposite side of the vehicle.

The hanger assembly 12 has the geometric configuration of a trapezoidal box, with a horizontal base plate 24 at the top of the box, and a parallel bottom plate 26 at the bottom of the box. The hanger assembly also includes an outboard vertical sidewall 28 and an inboard vertical sidewall 30 connected between the base plate 24 and bottom plate 26. Front and rear end walls 31, 32 connected between the base plate 24 and bottom plate 26 complete the box-like configuration of the hanger assembly. A series of vertical web members 33 connected between the base plate 24, the bottom plate 26, and the outboard sidewall 28 provide increased structural strength to the hanger assembly. Still further web members 34 are connected between the underside of the horizontal base plate 24 and the outboard sidewall 28 to enhance the structural strength of the hanger member. A vertical connector plate 36 extends upward from the top surface of the base plate 24. A plurality of holes are provided through the connector plate and the vehicle chassis, and nut and bolt threaded fasteners 38 are inserted through the holes to secure the connector plate and the hanger assembly to the vehicle chassis member 14. A plurality of web members 40 are secured between the connector plate 36 and the top surface of the base plate 24 to increase the structural strength of the connection between the hanger assembly and the vertical connector plate.

A trunnion shaft support bracket 42 is attached to the underside of the hanger assembly bottom plate 26 by a plurality of threaded fasteners 44. The trunnion shaft support bracket 42 suspends a trunnion shaft 46 from beneath the hanger assembly. A first end of the trunnion shaft projects from the outboard side of the trunnion shaft support bracket 42, and the opposite end of the shaft extends across the underside of the vehicle chassis to the trunnion shaft support bracket of the suspension system on the opposite side of the vehicle.

A center bushing assembly 50 is rotatably mounted on the projecting end of the trunnion shaft 46. The center bushing assembly comprises a rubber bushing 52 adhered to the end of the trunnion shaft 46, and a metal sleeve or housing 54 that is adhered to and surrounds the rubber bushing 52. A trunnion cap 56 is mounted on the end of the trunnion shaft 46 by a bolt 58 that extends through the trunnion cab and is threaded into an end plate 60 secured in the interior of the trunnion shaft adjacent its outboard end.

The compensator member 16 is comprised of a rectangular cross-section channel member having a top wall 62, an outboard sidewall 64, an inboard sidewall 66, and a bottom wall 68. The compensator sidewalls 64, 66 are mounted on the sleeve 54 of the center bushing assembly 50, with the sleeve extending through coaxial openings (not shown) in the sidwalls 64, 66. The compensator is reinforced by a plate 72 welded to the top wall 62, and a pair of plates 74, 76 welded to the outboard and inboard sidewalls 64, 66 respectively. A reinforcing plate 78 is also welded to the bottom wall 68 of the compensator member. The forward end of the compensator member converges toward, and is welded to, an external sleeve 82 of a bushing assembly 84 supported on the front axle seat 20. An additional reinforcing metal plate 86 is welded to both the top wall 62 of the compensator member 16 and the forward bushing external sleeve 82 to enhance the structural strength of the connection between the compensator member and the forward bushing. A still further reinforcing metal plate 88 is welded to both the bottom wall 68 of the compensator member and the underside of the bushing external sleeve 82 to provide still further structural strength to the connection of the compensator member to the bushing assembly 84.

A shock absorber 90 is pivotally connected to the compensator member 16 and the hanger assembly 12. A first end 92 of the shock absorber is connected to the inboard sidewall 66 of the compensator member adjacent its connection to the forward axle seat 20. The second end of the shock absorber 94 is connected to a shock absorber bracket 96 secured to the underside of the horizontal base plate 24 of the hanger assembly 12.

The forward axle seat 20 supports the drive axle 97 of the tandem axle vehicle. The drive axle has a differential assembly 98 at its midpoint. A first torque rod bracket 99 is welded to the top of the differential assembly 98. A second torque rod bracket 100 is welded to the vehicle chassis 14, and a torque rod 101 is pivotally connected between the first and second torque rod brackets 99,100. The torque rod 101 maintains the relative orientation of the drive axle 97 and differential assembly 98 to the vehicle chassis 14 substantially constant, as the drive axle moves vertically and the compensator pivots about the trunnion shaft from the vehicle being driven over uneven road surfaces.

The rearward end of the compensator member 16 has a general inverted U shape with the bottom compensator wall 68 being removed. This configuration of the rearward end of the compensator permits access to the interior of the compensator through its open bottom and rearward ends 102, 104. An inclined compensator reaction plate 106 is welded in the interior of the rear section of the compensator between the inboard and outboard sidewalls 64, 66. A support plate 107 is welded behind the compensator reaction plate 106 and between the compensator sidewalls 64, 66 to provide additional support to the reaction plate. A torque beam pivot bushing assembly 108 is secured between the outboard and inboard sidewalls 64, 66 of the compensator member, just behind and below the center bushing assembly. The bushing assembly 108 is secured to the compensator by a bolt 110 that is inserted through coaxial holes provided in the inboard reinforcing side plate 76, the inboard compensator sidewall 66, the outboard compensator sidewall 64, and the outboard reinforcing plate 74. The bushing assembly bolt 110 is secured in place by a nut 112 threaded on the end of the bolt. Reinforcing web member 114, 116 are welded to the outboard and inboard reinforcement plates 74, 76 in a box like configuration around the nut and bolt head to provide additional structural strength to the compensator member in the area of its connection to the bushing assembly 108. The bushing assembly 108 is comprised of a metal sleeve 122 mounted on the bushing bolt 110 between the sidewalls 64, 66 of the compensator member. A rubber bushing 124 is mounted around the metal sleeve 122, and an exterior metal sleeve 126 is mounted around the rubber bushing 124.

The torque beam 18 has a general I-beam shaped cross section with a top wall 132 and a bottom wall 134 connected by a web or sidewall 136. The forward end 138 of the torque beam sidewall has a semi-circular shape that extends over a portion of the exterior metal sleeve 126 of the torque beam bushing assembly 108, and is welded to the sleeve. The top wall 132 and bottom wall 134 of the torque beam taper toward the torque beam bushing assembly at the forward end of the torque beam and are also welded to the exterior metal sleeve 126 of the bushing assembly. The connections of the forward end of the torque beam 18 to the exterior metal sleeve 126 of the torque beam bushing assembly 108 provide the pivoting connection between the torque beam 18 and the compensator member 16.

An inclined torque beam reaction plate 140 is secured to the wall 132 of the torque beam, adjacent the torque beam pivoting connection to the compensator member. The torque beam reaction plate 140 is secured in its inclined position relative to the top wall 132 of the torque beam by a plurality of web members 142 welded between the underside of the inclined reaction plate 140 and the top wall 132 of the torque beam.

A primary elastomeric spring 144 is secured between the top wall 132 of the torque beam 18 and the underside of the top wall 62 of the compensator member 16. The primary spring 144 is comprised of a plurality of rubber blocks 146 separated by a plurality of metal plates 148. The blocks are reinforced with the metal plates to give the primary spring added shear strength. The top most metal plate of the primary spring 144 is secured to the top plate 74 of a compensator member 16 by a plurality of screws 150. The bottom most metal plate of the primary spring 144 is secured to the top wall of the torque beam 132 by a plurality of screws 152. A web member 154 is attached between the top wall 132 and the bottom wall 134 of the torque beam just below the primary spring 144 to add additional reinforcement to the torque beam in the area of the spring.

A secondary spring 160 is secured between the compensator reaction plate 106 and the inclined torque beam reaction plate 140. The secondary spring 160 is also comprised of a plurality of rubber blocks 162, and a plurality of metal plates 164 inserted between the rubber blocks to provide shear strength to the secondary spring. The top most metal plate of the secondary spring is secured to the inclined compensator reaction plate by screws (not shown), and the bottom most metal plate of the secondary spring 160 is secured to the inclined torque beam reaction plate 140 by screws.

The primary spring 144 functions as the main spring for the tandem axle suspension system. The secondary spring 160 may, if desired, be constructed of a rubber having a significantly different hardness than the rubber blocks of the primary spring so that they come into compression for heavy vehicle loads and limit the amount of compression and deflection of the primary spring than if the primary spring alone was supporting the vehicle load.

The rearward end of the torque beam 18 opposite its pivot bushing connection to the compensator member 16 is provided with a horizontal tubular channel member 170 extending laterally through a hole (not shown) in the sidewall 136 of the torque beam and welded in place. At the extreme rearward end of the torque beam 18, the bottom wall 134 of the torque beam is stepped upward so that the vertical space between the torque beam top wall 132 and the torque beam bottom wall 134 is reduced and is less than the vertical distance between the torque beam top wall and bottom wall for the rest of the torque beam. Coaxial holes (not shown) are provided in the top and bottom torque beam walls 132, 134 adjacent the rearward end of the torque beam. A vertical tubular channel member 172 extends between the coaxial holes and is welded between the top and bottom walls 132, 134 of the torque beam.

The rear axle seat assembly 22, supporting the drag axle 174 of the tandem axle vehicle, is secured to the rearward end of the torque beam 18. The rear axle seat assembly comprises outboard and inboard sidewalls 176, 178 welded to the drag axle 174 and extending downward from the axle over opposite sides of the torque beam 18. A plurality of vertical web members 180 are welded between the outboard and inboard axle seat sidewalls 176, 178 and the drag axle 174. The web members provide additional reinforcement to the connection between the rear axle seat assembly 22 and the drag axle 174. A top horizontal reinforcement plate 182 is welded between the sidewalls 176, 178 of the axle seat assembly just below their connection to the drag axle 174. A pair of coaxial holes 184, 186 are provided in the axle seat sidewalls 176, 178, just forward of the connection between the sidewalls and the drag axle.

A nut and bolt fastener 188, 200 is inserted through the coaxial holes 184, 186 of the axle seat sidewalls, and through the tubular channel 170 of the torque beam, to pivotally secure the rear axle seat assembly 22 to the rear end of the torque beam 18. The pivoting connection permits the rear axle seat 22 to pivot a limited distance upward and downward across the longitudinal axis of the torque beam to maintain its angular orientation relative to the vehicle chassis substantially constant and thereby automatically stabilize the rear drag axle. A pair of square washers 202, 204 are provided on the nut and bolt fastener 188, 200 outside the sidewalls 176, 178 of the rear axle seat, and a plurality of web members 206, 208 are secured to the outboard and inboard sidewalls 176, 178 of the rear axle seat around the washers 202, 204 to add reinforcement to the pivoting connection between the rear axle seat 22 and the torque rod 18.

An additional horizontal plate member 212 is secured to the lower edges of the inboard and outboard axle seat sidewalls 176, 178 adjacent the rearward most edge of the sidewalls. The additional horizontal plate 212 and the top horizontal plate 182 are provided with a pair of coaxial holes 214, 216. A pair of rubber grommets 218, 220 are positioned coaxial to the pair of holes 214, 216, with one between the top plate 182 of the axle seat and the top wall 132 of the torque beam, and one between the additional plate 212 of the axle seat and the bottom wall 134 of the torque beam. A bolt 222 is inserted through the hole 214 of the horizontal plate 212, the bottom rubber grommet 220, a hole (not shown) in the torque beam bottom wall 134, the torque beam tubular channel 172, a hole (not shown) in the torque beam top wall 132, the top rubber grommet 218, and the hole 216 in the axle seat top horizontal plate 182, and is secured in place by a nut 224.

The pivoting connection between the axle seat 22 and the torque beam 18 by the horizontal nut and bolt connector 188, 200 enables the axle seat to automatically stabilize the rear drag axle 174 without the use of a parallelogram linkage assembly such as that employed by the forward drive axle 97. The pivoting of the axle seat 22 relative to the torque beam 18 as the vehicle is driven over an uneven road surface is limited by the pair of rubber grommets 218, 220 held in position between the top plate 182 of the axle seat and the top wall 132 of the torque beam, and the additional plate 212 of the axle seat and the bottom wall 234 of the torque beam respectively by the vertical nut and bolt connector 224, 222 between the axle seat and torque beam. As the drag axle 174 passes over an uneven road surface and falls vertically downward into a hole in the surface, the torque beam 18 will pivot downward as viewed in FIG. 1 about its pivot bushing connection 108 to the compensator member 16. As the torque beam pivots downward, the axle seat 22 pivots upward about its pivot connection to the torque beam by the nut and bolt connector 188, 200. The pivoting movement of the axle seat relative to the torque beam is limited by the bottom rubber grommet 220 that is compressed between the bottom wall 134 of the torque beam and the additional plate 212 of the axle seat. As the axle seat 22 pivots upward relative to the torque beam 18 as the torque beam pivots downward, the axle seat substantially maintains its relative orientation and the orientation of the drag axle 174 it supports to the vehicle chassis 14. Conversely, as the torque beam 18 pivots upward about its pivot bushing connection 108 to the compensator member 16, the axle seat 22 will tend to pivot downward relative to the torque beam 18 about its pivot connection to the torque beam by the nut and bolt connector 188, 200. The downward pivoting movement of the axle seat is limited by the compression of the upper rubber grommet 218 positioned between the top plate 182 of the axle seat and the top wall 132 of the torque beam. The limited downward pivoting movement of the axle seat 22 relative to the torque beam 18 automatically maintains the relative orientation of the axle seat and the drag axle 174 it supports to the vehicle chassis 14. In the above described manner, the pivot connection between the axle seat 22 and the torque beam 18 and the pair of rubber grommets 218, 220 positioned between the axle seat and torque beam automatically stabilize the drag axle 174 without the need for a parallelogram linkage assembly such as that employed with the drive axle 97.

The above described unique structure of the compensator 16, with the drive axle being supported by a forward axle seat pivotally connected to the compensator, and the drag axle being pivotally connected to the torque beam that is pivotally connected to the compensator, distributes the vehicle load transmitted through the hanger assembly and trunnion shaft asymmetrically through the compensator so that a majority of the vehicle load is carried by the front drive axle of the tandem axle vehicle, and the remainder of the vehicle load is carried by the rear drag axle of the vehicle.

While the present invention has been described by reference to a specific embodiment, it should be understood that modifications and variations of the invention may be constructed without departing from the scope of the invention defined in the following claims.

What is claimed is:

1. A tandem axle suspension system for a vehicle having at least two axles and a chassis, the suspension system comprising:
    a hanger means adapted to be secured to a vehicle chassis;
    a first axle seat means adapted to support a first vehicle axle;
    a second axle seat means adapted to support a second vehicle axle;
    a load compensator means connected between the first axle seat means and the hanger means; and
    a torque beam means connected between the second axle seat means and the load compensator means.

2. The suspension system of claim 1 comprising:
    the torque beam means being pivotally connected to the load compensator means.

3. The suspension system of claim 2 comprising:
    the torque beam means being pivotally connected to the second axle seat means.

4. The suspension system of claim 1 comprising:
    the first axle seat means supporting a vehicle drive axle, and the second axle seat means supporting a vehicle drag axle.

5. The suspension system of claim 1 comprising:
    the load compensator means having first and second ends, the first end being pivotally connected to the first axle seat means and the second end being mechanically connected to the torque beam means.

6. The suspension system of claim 5 comprising:
    the second end of the load compensator means being mechanically connected to the torque beam means by a first spring connected between the second end of load compensator means and the torque beam means.

7. The suspension system of claim 6 comprising:
    the load compensator means and the torque beam means being mechanically connected by a second spring, the second spring being connected between the load compensator means and the torque beam means in a position to resist both vertical and horizontal forces exerted between the load compensator means and the torque beam means, and the first spring being connected between the load compensator means and the torque beam means in a position to resist vertical forces exerted between the load compensator means and the torque beam means.

8. The suspension system of claim 5 comprising:
    the load compensator means being pivotally connected to the hanger means at a point on the load compensator means intermediate its pivot connection to the first axle seat means and its mechanical connection to the torque beam means.

9. The suspension system of claim 8 comprising:
    the load compensator means being pivotally connected to the torque beam means at a point on the load compensator means intermediate its pivot connection to the hanger means and its mechanical connection to the torque beam means.

10. The suspension system of claim 1 comprising:
    the torque beam means having first and second ends, the first end being pivotally connected to the load compensator means and the second end being pivotally connected to the second axle seat means.

11. The suspension system of claim 10 comprising:
    the second end of the torque beam means being pivotally connected to the second axle seat means by a pair of connector assemblies, a first connector assembly of the pair being connected horizontally between the torque beam means and the second axle seat means, and a second connector assembly of the pair being connected vertically between the torque beam means and the second axle seat means.

12. The suspension system of claim 11 comprising:
    the first connector assembly being connected between the torque beam means and the second axle seat means to enable relative movement between the torque beam means and the second axle seat means, and the second connector assembly being connected between the torque beam means and the second axle seat means to limit the relative movement between the torque beam means and the second axle seat means.

13. The suspension system of claim 12 comprising:
the second connector assembly including at least one elastomeric grommet positioned between the torque beam means and the second axle seat means to dampen relative movement between the torque beam means and the second axle seat means.

14. The suspension system of claim 6 comprising:
the first spring being an elastomeric spring.

15. The suspension system of claim 7 comprising:
the second spring being an elastomeric spring.

16. An asymmetric tandem axle suspension system for a vehicle having at least two axles and a chassis, the suspension system comprising:

a hanger means adapted to be suspended from a vehicle chassis;
a first axle seat means adapted to support a vehicle drive axle;
a second axle seat means adapted to support a vehicle drag axle;
a first torque beam means having a first and second end;
a second torque beam means having a first and a second end;
the first torque beam means being connected to the first axle seat means at its first end, and being connected to the hanger means between its first and second end; and,
the second torque beam means being connected to the first torque beam means at its first end, and being connected to the second axle seat means at its second end.

* * * * *